United States Patent
Murata

(10) Patent No.: US 8,612,981 B2
(45) Date of Patent: Dec. 17, 2013

(54) TASK DISTRIBUTION METHOD

(75) Inventor: Kan Murata, Kanagawa (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 1618 days.

(21) Appl. No.: 11/854,707

(22) Filed: Sep. 13, 2007

(65) Prior Publication Data

US 2008/0109815 A1 May 8, 2008

(30) Foreign Application Priority Data

Nov. 7, 2006 (JP) ................................. 2006-302057

(51) Int. Cl.
*G06F 9/46* (2006.01)

(52) U.S. Cl.
USPC ........... 718/102; 718/100; 718/101; 718/103; 718/105; 718/107

(58) Field of Classification Search
None
See application file for complete search history.

(56) References Cited

U.S. PATENT DOCUMENTS

| 6,480,876 B2* | 11/2002 | Rehg et al. | 718/100 |
| 2006/0179281 A1* | 8/2006 | Jensen et al. | 712/214 |

FOREIGN PATENT DOCUMENTS

| JP | 3-48361 | 3/1991 |
| JP | 9-185589 | 7/1997 |
| JP | 2002-358293 | 12/2002 |
| WO | 2006/011189 | 2/2006 |

OTHER PUBLICATIONS

Markatos et al. Using Processor Affinity in Loop Scheduling on Shared-Memory Multiprocessors. [online] (Apr. 1994). IEEE, IEEE Transactions on Parallel and Distributed Systems, pp. 1-35. Retrieved From the Internet <http://citeseerx.ist.psu.edu/viewdoc/download-?doi=10.1.1.81.4981&rep=rep1&type=pdf>.*

Seveik, Kenneth C. Application Scheduling and Processor Allocation in Multiprogrammed Parallel Processing Systems. [online] (Mar. 1993). University of Toronto, pp. 1-34. Retrieved From the Internet <http://citeseerx.ist.psu.edu/viewdoc/download?doi=10.1.1.53.1217&rep=rep1&type=pdf>.*

Questioning dated Oct. 26, 2010, from the corresponding Japanese Application.

Decision of Refusal mailed Feb. 10, 2009, from the corresponding Japanese Application.

Notification of Reason(s) for Refusal mailed Sep. 30, 2008, from the corresponding Japanese Application.

* cited by examiner

*Primary Examiner* — Emerson Puente
*Assistant Examiner* — Steven Do
(74) *Attorney, Agent, or Firm* — Katten Muchin Rosenman LLP

(57) ABSTRACT

A method for distributing a task to plural processors is provided. A distribution rule of distributing plural tasks to sub processors or the main processor, respectively, is previously written in a program code of an application configured to include plural tasks. At the time of executing the application, the main processor reads out the distribution rule, and distributes plural tasks to the sub processors or the main processor, respectively, in accordance with the distribution rule.

10 Claims, 7 Drawing Sheets

TASK DISTRIBUTION METHOD

BACKGROUND OF THE INVENTION

1. Field of the Invention

The present invention relates to a technique of distributing tasks to processors in a multiprocessor system equipped with plural processors.

2. Description of the Related Art

With the noticeable progress in computer graphics technology and image processing technology for use in the fields of computer games or digital broadcasting in recent years, the capability of processing a high-definition image at higher speed is needed for information processing apparatus such as computers, game consoles, and television sets. To execute an arithmetic processing with high performance in the above information processing apparatus, a method for processing plural tasks in parallel or a pipeline method is employed by distributing tasks to the processors, respectively, in the information processing apparatus equipped with plural processors.

When the process demanding the real-time performance is executed such as music reproduction, playing of the video, generation of the gaming screen, etc. in a multiprocessor system, each of the tasks has to be completed in a given period of time while utilizing the processors in an efficient manner. Thus, how to distribute tasks to the processors, respectively, is an important issue in the multiprocessor system.

SUMMARY OF THE INVENTION

The present invention has been made in view of the above circumstances and has a general purpose of providing a technique of distributing tasks in a multiprocessor system in an efficient manner.

According to an embodiment of the present invention, there is provided a method of distributing a task to plural processors. In this distribution method, the distribution rule for distributing plural tasks to the processors, respectively, is described in advance, in a program code of an application program configured to include plural tasks. Then, when the application program is executed, the distribution rule is read and plural tasks are distributed to designated processors in accordance with the rule.

Herein, the "task" refers to an application program that is programmed for achieving a certain purpose or content of information processing included therein. The "task" may correspond to the application program or may correspond to a unit smaller than the application program, such as the controlling of input or output or a command designated by a user. The "task" may correspond to a certain process or a unit of function. Also, "plural processors" may be constructed separately in respect of the physical architecture, or may be composed of plural arithmetic core units.

A "distribution rule" may include a description of which processor each of the tasks is assigned to, or may be a description of which method is selected from some distribution rules written in the outside of the application program. That is to say, the "distribution rule" may be any rule that includes a description that affects the distribution of the tasks to the processors.

The above embodiment allows a programmer of the application program to designate which processor a given task should be assigned to, thereby enabling an efficient task distribution.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
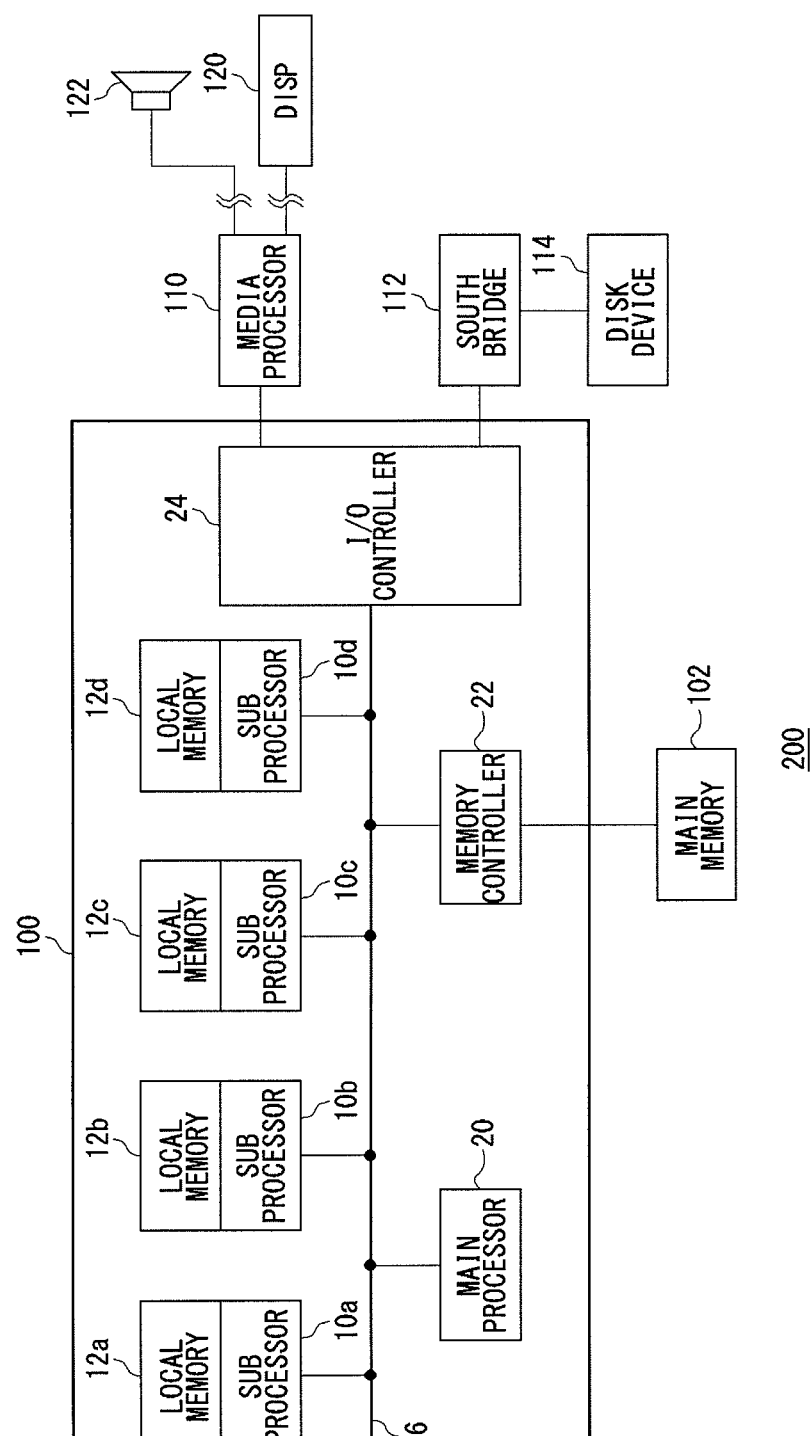
FIG. 1 illustrates a functional block diagram of information processing apparatus according to an embodiment of the present invention.

The invention will now be described based on preferred embodiments which do not intend to limit the scope of the present invention but exemplify the invention. All of the features and the combinations thereof described in the embodiment are not necessarily essential to the invention.

A description will first be given of the overview of a task distribution method and an information processing apparatus that utilizes the task distribution method, according to an embodiment of the present invention. The technique of distributing tasks according to an embodiment of the present invention is used for distributing tasks to processors, respectively, in the information processing apparatus equipped with plural processors, such as personal computers, game consoles, HDD recorders, DVD recorders, and the like.

According to an embodiment of the present invention, there is provided a method for distributing a task to a plurality of processors, comprising: writing a distribution rule for distributing a plurality of the tasks to the plurality of the processors in a program code of an application program configured to include the plurality of the tasks; and reading the distribution rule at the time of executing the application program to distribute the plurality of the tasks to designated processors, respectively, in accordance with the distribution rule.

The above embodiment allows a programmer of an application program to designate which of the processors executes a given task, thereby enabling the task distribution in an efficient manner, and in addition, allowing estimating the period of time to complete a given process.

Another embodiment of the present invention relates to a method for distributing a task to a plurality of processors, comprising: detecting a distribution rule for distributing a plurality of the tasks to the plurality of the processors previously written in a program code of an application program configured to include the plurality of the tasks; and distributing the plurality of the tasks to the plurality of the processors designated, respectively, in accordance with the distribution rule detected.

In any of the above-described methods, the plurality of the tasks may be processes based on an identical program code as well as being the tasks, each executed for each piece of data to be processed.

In the above case, when a given process is executed on plural pieces of data, the tasks for the plural pieces of the data are distributed to the processors, respectively, based on the distribution rule. As a result, when the plural pieces of the data are processed, the time required for processing can be estimated.

Also, the plural tasks may be processes, each requiring a substantially identical period of time. In such case, the plural tasks may be the processes based on different program codes, respectively.

In an embodiment, the distribution rule may include a description of which one of the plurality of the processors the task of processing each piece of data is assigned to, with the number of the pieces of data included in a predetermined unit of processing as a parameter. In the above case, the method may further comprise detecting the number of the pieces of the data to be processed included in the predetermined unit of processing, and the each of the tasks may be assigned to a processor in accordance with the number of the pieces of the data detected.

"Predetermined unit of processing" may be a unit of a certain period of time or may be a group of data including plural pieces of data. The predetermined unit of processing means a unit of processing unified according to a given rule. Herein, "a piece of data" denotes a unit of data extractable in a predetermined method such as data segmented by a given format, data having a given number of bits or bytes, or the like.

In an embodiment, in a case where the number of the processors is N, where N is an integer equal to or more than 2, and the pieces of the data to be processed is M, where M is a natural number, given that M has an integer L as a divisor, L ranging between 2 and N, both inclusive, the distribution rule may be defined such that M tasks corresponding to M pieces of the data are distributed to L processors in parallel.

In such case, it is possible to prevent the variation in the period of time occupied by the task of each processor, and it is also possible to provide a processor that is not occupied by the task, depending on the number of the pieces of the data. Thus, another process can be distributed to an unoccupied processor.

Yet another embodiment of the present invention relates to a method for distributing a task to a plurality of processors, comprising: a first method of distributing the tasks to be processed with a priority given in a direction in which the number of the processors is increased so as to decrease a period of time occupying each of the processors; and a second method of distributing the tasks to be processed with a priority given to a time axis direction so as to decrease the number of the processors to be occupied, wherein the first method and the second method are appropriately switched.

Depending on the task, the process is to be executed using as few processors as possible even if a certain period of time is required, or the process is to be executed in the shortest possible time by increasing the number of the processors. This embodiment allows a programmer to choose one from two distribution methods according to the content of processing, thereby enhancing the flexibility of software design.

In an embodiment, the first method and the second method are defined in a layer lower than an application program, and the application program executed on the layer may include a program code designating which of the first method or the second method each of the tasks is to be distributed by, when the plurality of given tasks included in the program are executed.

The layer lower than the application program includes an Operating System (OS) layer, middleware, or kernel, which is a prerequisite for an application program to operate thereon.

Further another embodiment of the present invention is an information processing apparatus comprising: a plurality of processors which execute predetermined processes on distributed data; a detector which detects the number of pieces of the data included in a predetermined unit of processing; and a distributor which distributes the piece of the data to the plurality of the processors, respectively, in accordance with a predetermined distribution rule in which the number of the pieces of the data included in the predetermined unit of processing is defined as a parameter.

The above embodiment allows a programmer to control the state of occupancy of the processor with the number of pieces of data as a parameter.

In an embodiment, in a case where the number of the processors is N, where N is an integer equal to or more than 2, and the pieces of the data included in the predetermined unit of processing is M, where M is a natural number, given that M has an integer L as a divisor, L ranging between 2 and N, both inclusive, the distribution rule is defined such that M tasks corresponding to M pieces of the data are distributed to L processors in parallel.

The distributor may distribute the data in accordance with a first method or a second method, which has been selected, the first method distributing the data with a priority given in a direction in which the number of the processors is increased so as to decrease a period of time occupying each of the processors, the second method distributing the data with a priority given to a time axis direction so as to decrease the number of the processors to be occupied.

The invention will be described in more detail in the following description of the preferred embodiment with reference to the drawings. Identical numerals shown in the drawings are used to identify the same or similar constitutional elements, members, processes, etc, and overlapped description will be omitted appropriately. In addition, it should be understood that the description of the embodiment is illustrative of the invention and is not to be construed as limiting the invention. All features described in the embodiment and the combinations thereof are not always essentials of the invention.

FIG. 1 illustrates a functional block diagram of an information processing apparatus 200 according to an embodiment of the present invention. The information processing apparatus 200 is provided with: an overall controller 100; a main memory 102; a media processor 110; a south bridge 112; and a disk device 114. A display device 120 and a sound outputting unit 122 such as a speaker or headphone are provided outside the information processing apparatus 200. The display device 120 and the sound outputting unit 122 respectively output images and sounds obtained as a result of data processing performed by the overall controller 100 and the media processor 110.

In the figures hereinafter, each of the constitutional elements depicted as functional blocks that perform various processes may be composed of a Central Processing Unit (CPU), a memory, or another Large Scale Integration (LSI) in terms of hardware, and may be fulfilled by a program loaded into the memory in terms of software. It should be understood by those skilled in the art that each functional block and various variations thereof can be accomplished by, including but not limited to, only hardware, only software, or combinations thereof.

In the information processing apparatus 200, the Operating System (hereinafter, simply referred to as "OS") runs to provide the function and environment so that the information processing apparatus 200 is used in an efficient manner and to control the whole apparatus in an integrated fashion.

The outline of the whole configuration of the information processing apparatus 200 will now be described. An overall controller 100 is an arithmetic unit for executing the common arithmetic processing defined in an application program (hereinafter, simply referred to as application), in the information processing apparatus 200. Meanwhile, the media processor 110 is a unit called graphics processor as well as being an arithmetic unit specialized for the arithmetic processing relating to graphics. Also, the media processor 110 has a function of outputting an audio signal generated by the information processing apparatus 200, to the sound outputting unit 122. The overall controller 100 and the media processor 110 generate image data to be displayed in the display device 120 and audio data in cooperation with each other.

Next, the configuration of the overall controller 100 will be described.

The overall controller 100, serving as a unit with functions for performing arithmetic processing, is configured as a multiprocessor system provided with a single main processor 20 and plural sub processors 10a through 10d (hereinafter, sometimes generically referred to as sub processor 10). The overall controller 100 also includes: plural local memories 12a through 12d respectively provided for the sub processor 10a through 10d; a memory controller 22; and an I/O controller 24. Blocks are coupled with each other via a bus 26, and are communicable with each other. In FIG. 1, four sub processors are depicted, but the number thereof is not limited. An arbitrary number of the sub processors, such as six, eight, or ten may be provided. Also, plural main processors 20 may be provided.

The main processor 20 and the sub processors 10 execute the tasks assigned, respectively. In an embodiment of the present invention, the main processor 20 and the sub processors 10 have different characteristics. The characteristics of the main processor 20 and those of the sub processors 10 will now be described.

1. With Regard to Memory Access

The main processor 20 is a processor that performs common processes, and is provided with a cache memory, whereas the sub processor 10 is not provided with a cache memory. The main processor 20 is capable of processing at high speed by carrying out a speculative instruction execution using a cache memory, but the cache hit or the cache miss varies the number of cycles required for executing a process or a task. Conversely, since the sub processor 10 is not provided with a cache memory, it is possible to estimate the time required for executing a process with certainty.

In addition, the main processor 20 is capable of performing the data processing using the main memory 102, and so is suitable for large volumes of data processing. Conversely, since the sub processor 10 cannot utilize the main memory 102 directly and performs the data processing using a local memory 12, the sub processor 10 is not suitable for large volumes of data processing.

2. With Regard to Instruction Support

The main processor 20 supports the general instruction set, whereas the sub processor 10 supports the instruction set specialized for a specific operation. The specific operation includes, for example, arithmetic operation and bit operation.

The sub processor 10 is capable of performing the aforementioned operations at a higher speed. Since the main processor 20 supports the general instruction set, the speed thereof for processing a specific operation is decreased.

In addition, the sub processor 10 employs Single Instruction Multi-Data (SIMD) architecture, and so is suitable for parallel arithmetic operation on data.

Furthermore, the number of pipeline stages of the sub processor 10 is greater than that of the main processor 20, so the sub processor 10 has a configuration suitable for real-time processing.

The task distribution to the sub processor 10 and the main processor 20, each having the above characteristics, will be described later in detail. The main processor 20 and the sub processor 10 respectively perform the tasks assigned thereto, thereby enabling parallel processing or pipeline processing of plural tasks.

The technique of distributing tasks to the processors, described later, is suitably utilized on the assumption of the above characteristics, according to an aspect. However, the characteristics of the main processor 20 and those of the sub processor 10 have been described as examples in order to facilitate an understanding of the technique for distributing tasks, described later. The technique for distributing tasks according to an embodiment of the present invention is not limited in its application to the processors having the above characteristics.

A Direct Memory Access Controller (DMAC), not shown, included in the main processor 20 or in the sub processor 10 controls data transferring, data saving, etc. between the main memory 102 and a graphics memory, not shown, of the media processor 110, after receiving an instruction issued from the main processor 20 or the sub processor 10.

The main memory 102 is a memory area mainly used by the overall controller 100. Data relating to the execution state of a task is stored in the main memory 102. For example, modeling data obtained after the overall controller 100 processes the task relating to computer graphics is temporarily stored in the main memory 102. Data generated by the media processor 110 may be saved in the main memory 102. The memory controller 22 controls data access to the main memory 102 from each unit in the overall controller 100.

As described above, the overall controller 100 is connected to the media processor 110 and the south bridge 112. The I/O controller 24 is a block for controlling sending and receiving data between the media processor 110 or the south bridge 112 and an internal block of the overall controller 100. The south bridge 112 is connected to the disk device 114, a network connection device, or a USB memory. The south bridge 112 is a block for controlling the data transfer between each of the afore-mentioned devices and the overall controller 100.

The disk device 114 is an optical disc device that can read an optical disc such as a Blu-Ray Disc (BD), Digital Versatile Disc (DVD), and Compact Disc (CD). Also, the disk device 114 may be a hard disk device. Image data including a still image and a moving image or audio data is stored in the disk device 114 in a predetermined format.

The media processor 110 is a unit dedicated to mainly executing image processing in cooperation with the overall controller 100. An example is the rendering operation. The media processor 110 performs the image processing relating to each task processed by the overall controller 100, and outputs the generated still image or moving image to the display device 120. The media processor 110 may divide plural image processes into time segments to perform the segments in parallel. In addition, the media processor 110 has a function of outputting the audio data generated by the overall controller 100 to the sound outputting unit 122.

The media processor 110 is provided with a graphics memory, a memory controller, an arithmetic unit, a control block, a display controller, etc, which are not shown. The aforementioned blocks are connected to each other via a bus, and are capable of sending, receiving, and sharing data therebetween.

The control block is a block for controlling the whole media processor 110. The control block controls the arithmetic unit, the graphics memory, and the display controller in an integrated fashion, and performs the synchronization management and timer management while data is being transferred between the blocks. The arithmetic unit performs various arithmetic operations relating to graphics according to an instruction given from the control block. An example thereof is a series of rendering processes by which coordinates are converted, hidden surfaces are removed, and the shading is performed, on the basis of three-dimensional modeling data, and the image frame data is created and written into a frame buffer.

The graphics memory is a memory region used and managed by the media processor 110 so as to store graphics data. The graphics memory is provided not only with the frame buffer or Z buffer where image frame data is stored but also with regions corresponding to vertex data, texture data, and color lookup table, respectively serving as fundamental data to be referred to when the image frame data is rendered.

The display controller generates horizontal and vertical synchronization signals, and sequentially reads pixel data of the image frame data in the shape of a line, from the frame buffer stored in the graphics memory, in accordance with the display timing of the display device 120. Then, the display controller converts the pixel data that has been read in the shape of a line from the digital data including color values in RGB into a format corresponding to the display device 120, and outputs the pixel data in the converted format.

As stated heretofore, the whole configuration and the outline of the operation of the information processing apparatus 200 have been described. In the following, while focusing the attention on how tasks are distributed to the sub processor 10 and the main processor 20 included in the overall controller 100, the technique for enabling the task distribution will now be described in detail.

In the description below, the task distribution technique according to an embodiment of the present invention will be described with an example of the reproduction of a Super Audio Compact Disc (SACD). The reproduction of SACD is typically enabled by use of a dedicated Digital Signal Processor (DSP). In the case where a common multiprocessor system installed in the information processing apparatus 200 is used for processing, the necessary tasks have to be distributed to the processors, respectively, in an efficient manner, in consideration of the real-time performance. Although the device dedicated for reproducing a SACD does not have to perform another process, the information processing apparatus 200 may execute another application, for example, an application for recording a TV program, in parallel with the reproduction of the SACD. This creates the situation where available hardware resources are limited by the operation for the above application.

Figure 2:
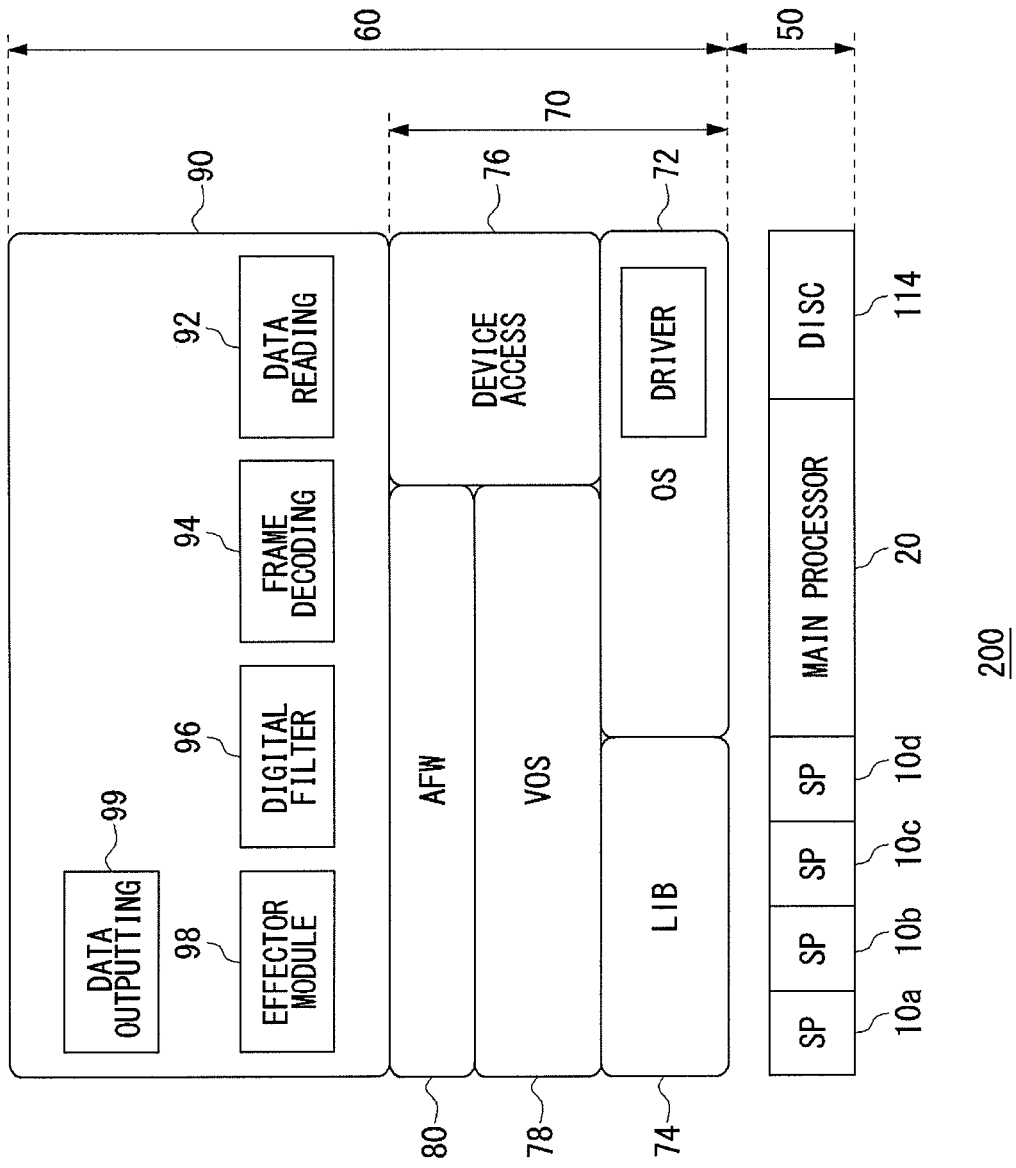
FIG. 2 illustrates a software block diagram of the information processing apparatus of FIG. 1.

FIG. 2 illustrates a software block diagram of the information processing apparatus 200, according to an embodiment of the present invention. The information processing apparatus 200 includes in a hardware layer 50: the above-described sub processors 10a through 10d; the main processor 20; and the disk device 114.

A software layer 60 includes: a core layer 70; and an application program layer (hereinafter, simply referred to as application) 90. The core layer 70 includes: an OS 72; a library 74; a device access layer 76; a virtual OS 78; and an application framework (hereinafter, simply referred to as AFW) 80. The core layer 70 is a lower layer of the application 90, and an application is programmed and executed by functionally depending on the core layer.

The OS 72 offers the function and environment so that the information processing apparatus 200 can be used in an efficient manner, and the OS 72 is software that controls the main processor 20, the disk device 114 and the like in an integrated fashion. The library 74 defines the instruction or the like to be executed on the sub processor 10. The OS 72 and the library 74 may be recognized as the OS.

The OS 72 itself causes the main processor 20 and the sub processors 10a through 10d to execute the tasks given by an upper layer, according to the method defined in the OS level. When there are plural tasks to be processed, the OS 72 monitors the states of occupying the plural sub processors 10a through 10d and then assigns the tasks successively to the sub processors that are not occupied, according to the conventional and general method. The general application that does not need a special task distribution is executed on the OS 72 without the intervention of the virtual OS 78 or the AFW 80 described below. Therefore, an application programmer is able to write a program without recognizing the existence of the sub processors 10 or the main processor 20.

The virtual OS 78 is arranged in an upper layer of the OS 72 and the library 74. As described, the OS 72 itself distributes a given task to the main processor 20 and the sub processors 10 based on the rule defined in an internal kernel. Meanwhile, the virtual OS 78 is a layer provided so that the application 90 may not be dependent on the hardware. The virtual OS 78 hides the difference between the sub processor 10 and the main processor 20 each having specific characteristics in view of hardware or software. The virtual OS 78 allows the AFW 80, which is an upper layer thereof, to access the sub processor 10 and the main processor 20 as the processors of the same type.

The AFW 80 is arranged in an upper layer of the virtual OS 78. The AFW 80 manages the state transition of the main processor 20 and those of the processors 10a through 10d in lieu of the OS 72 in the conventional method. Also, a predetermined unit of processing is defined in the AFW 80. The AFW 80 distributes the tasks to the main processor 20 and the sub processors 10 according to a predetermined distribution rule in units of a given process. Plural distribution rules are predetermined in the AFW 80 and any one of the distribution rules is selected on the basis of an instruction given by the application 90 in an upper layer. In addition, the AFW 80 may distribute the tasks on the basis of the rule designated by the application 90 in an upper layer, in lieu of the distribution rule defined therein. In the task distribution, the AFW 80 manages the input and output of data accompanying each task, and also manages the input and output timings. Furthermore, the AFW 80 offers various types of utilities to the upper layer.

Information recorded in the disc medium of SACD is encoded. The device access layer 76 is a layer for reading data from the disk device 114 and decoding the encoded data.

The application 90 reproduces the SACD, according to an embodiment of the present invention. The application 90 receives bit-stream data that has been decoded in the device access layer 76, and converts the data into Pulse Code Modulation (PCM) data by performing a necessary process. The application 90 includes: a data reading module 92; a frame decoding module 94; a filter module 96; an effector module 98; and a data outputting module 99, which are necessary for the SACD reproduction. A description will be given of the function of each module later in detail.

When the conventional OS is employed and there are plural tasks to be processed by the application 90, which of the plural processors each of the tasks is assigned to is not designated. Conversely, as shown in FIG. 2, the providing of the virtual OS 78 and the AFW 80 allows distributing the task produced by the application 90 to the sub processors 10 and to the main processor 20, according to the instruction given by the application 90. In the present embodiment of the present invention, the virtual OS 78 and the AFW 80 arranged in an upper layer of the conventional OS permit the task distribution instructed by the application 90, from perspective of the inheritance of the conventional software resources. However, when the OS is newly designed, the function of the OS 72 and that of the AFW 80 may be provided in the OS.

The following description will be given of the reproducing process of an SACD to be executed in the information processing apparatus 200 having the above configuration, in view of software and hardware.

Figure 3:
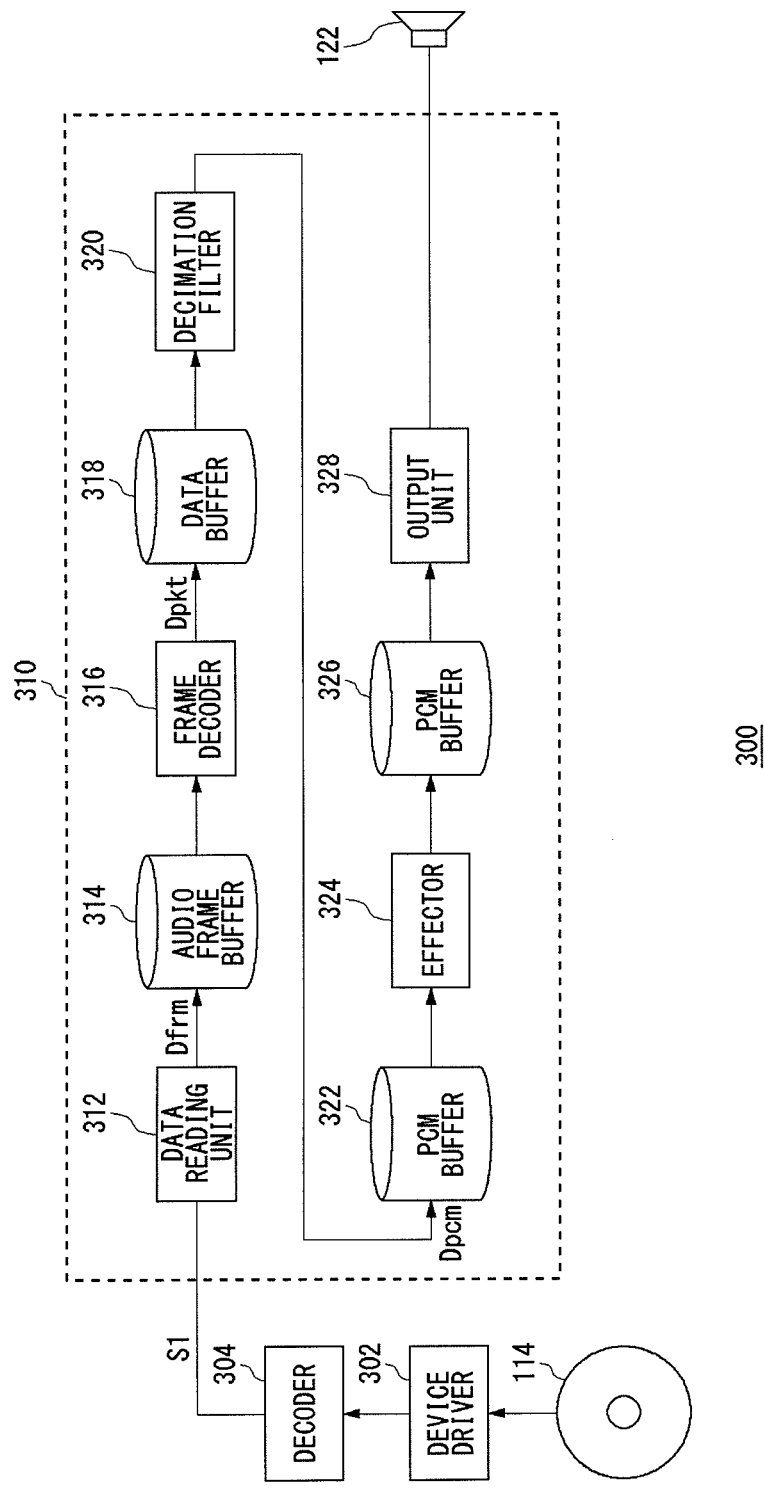
FIG. 3 illustrates a block diagram of the configuration of an SACD reproducing apparatus constructed by the information processing apparatus shown in FIG. 1 and FIG. 2.

FIG. 3 illustrates a block diagram of the configuration of an SACD reproducing apparatus 300 constructed by the information processing apparatus 200 shown in FIG. 1 and FIG. 2. The SACD reproducing apparatus 300 includes: the disk device 114; a device driver 302; a decoder 304; and a reproduction processor 310.

An SACD medium where audio data compressed in a given format is inserted into the disk device 114. The device driver 302 controls the rotation of the disk device 114, and sequentially reads out a given number of data, for example, 128 sectors of data at a time, from the medium. This function is fulfilled by cooperation of the driver of the OS 72 of FIG. 2, the south bridge 112 of FIG. 1, and the disk device 114.

The data read out by the device driver 302 is encoded. The decoder 304 decodes the encoded data. This process is initiated when the main processor 20, the memory controller 22, the main memory 102, and the I/O controller 24 are controlled by the device access layer 76 of FIG. 2. The decoder 304 outputs the audio data modulated by the Direct Stream Digital (DSD) process. The following description will be given of the case where the audio data is subjected to a lossless compression of the Direct StreamTransfer (DST) process. That is, audio data S1 output from the decoder 304 is data in the DSD format compressed by the DST process. When the data is not compressed by the DST process, the decompression process is skipped.

The reproduction processor 310 is made by cooperation of the software layer 60 including the application 90 of FIG. 2 and the internal blocks in the overall controller 100 of FIG. 1. The reproduction processor 310 decompresses the data compressed by the DST process, converts the decompressed data into PCM data, and outputs the PCM data. The configuration of the reproduction processor 310 will be described in the following. Various tasks are executed in the process of reproducing the SACD. Thus, the SACD reproducing apparatus 300 according to an embodiment of the present invention selects the processor to be used depending on the task, and distributes the task accordingly.

A data reading unit 312 reads out the audio data S1 compressed by the DST process and output from the decoder 304. The data reading unit 312 reads 128 sectors of data in a disc, as one data unit, analyses the data read, extracts only the data relating to the audio frame (hereinafter, referred to as frame data Dfrm), and stores the frame data Dfrm in an audio frame buffer 314 that follows the data reading unit 312 for each predetermined unit of processing. One piece of the frame data Dfrm includes audio data for two to six channels. The buffers installed in the SACD reproducing apparatus 300 including the audio frame buffer 314 are provided in a memory region such as the main memory 102 or the local memories 12a through 12d of FIG. 1.

The number of the frame data Dfrm included in a predetermined unit of processing varies in a given range, in accordance with the content of an audio signal to be reproduced. The predetermined unit of processing is arbitrarily set in the SACD reproducing apparatus 300. In the following description, it is assumed that the number of the frame data Dfrm included in a predetermined unit of processing varies 1 to 4. For example, the number of the frame data Dfrm is one or two at the beginning or ending of a song, is three in the normal reproduction, and is four at the maximum at the time of a trick play such as fast-forwarding, etc. One piece of the frame data Dfrm includes the amount of information equal to a reproduction time of $1/75$ seconds (hereinafter, simply referred to as frame time Tf). The data processing performed by the data reading unit 312 is distributed to the main processor 20. To put in other words, the data reading unit 312 is mainly implemented by the main processor 20 and a data reading module 92 of the application 90.

A frame decoder 316 reads the frame data Dfrm included in a predetermined unit of processing from the audio frame buffer 314. That is to say, the number of the frame data Dfrm to be input into the frame decoder 316 at a time varies between 1 and 4. The frame decoder 316 decompresses each piece of the frame data Dfrm compressed by the DST process, and converts the frame data into the audio data in the DSD format.

In the above decompression process, the amount of data is small because the data to be input is compressed, whereas there are lots of contents subject to the data processing. Therefore, the decompression process is performed by use of plural sub processors 10 each being capable of processing a small amount of data at high speed. The SACD reproducing apparatus 300 according to an embodiment of the present invention has a feature in the method of distributing the frame data Dfrm to plural sub processors 10.

It is assumed that a period of time longer than the frame time Tf is needed for completing the decompression process of one piece of the frame data Dfrm. Hereinafter, the period of time necessary for the decompression process will be referred to as a real processing time Tprc. For brevity, it is assumed that the real processing time Tprc is equal to "a" times as much as the frame time Tf, "a" being an integral multiple of the frame time Tf.

When the real processing time Tprc is "a" times as much as the frame time Tf, the processing capacity has to be enhanced to be as much as "a" times or more. Therefore, a total of "a" or more processors may be used on the average for processing one piece of the frame data Dfrm. The following description will be given of the process of distributing the tasks, specifically when "a" is 2.

The number of the frame data Dfrm that should be processed at a time is four at the maximum. If four sub processors 10a through 10d are available, the task corresponding to the frame data Dfrm may be assigned to sub processors 10, respectively. This case is desirable in consideration of the real-time performance in that data corresponding to 4 Tf can be processed in the real processing time Tprc, which is equal to 2 Tf. However, there is a problem in that all the sub processors 10 are occupied and another task cannot be processed. An example of another task is an effects process, described later.

In the information processing apparatus 200 according to an embodiment of the present invention, three sub processors 10a through 10c at the maximum are assigned for the decompression process in order to perform another task. That is to say, it is assumed that the task distribution technique discussed herein has the number "c" of the available sub processors 10 (c=3 in this example), which is smaller than the maximum number "b" (b=4 in this example) of pieces of the frame data that should be processed at a time.

As stated, in the present embodiment, the application 90 is capable of designating which task is assigned to which processor, when there are plural tasks that should be processed. The frame decoding module 94 that is a program module for fulfilling the function of the frame decoder 316 distributes the task of decompressing the frame data Dfrm to three sub processors 10a through 10c. The frame decoding module 94 including plural tasks, namely, the task of decompressing each of the plural pieces of the frame data Dfrm has a program code in which the rule for distributing plural tasks to the processors, respectively, is previously written.

FIG. 4A through FIG. 4D schematically show a task distribution rule written in the frame decoding module 94. The task distribution process may be performed by the main processor 20 operating in a layer immediately lower than the OS 72. In this case, the main processor 20, while operating the task relating to the frame decoding module 94, reads out the distribution rule and distributes the tasks to the sub processors 10a through 10c, respectively, according to the rule.

In the process of decompressing the compressed data, the tasks respectively distributed to the sub processors 10 are processes based on an identical program code, and each of the tasks is executed for each piece of the frame data Dfrm to be processed.

The distribution rule shown in FIG. 4A through FIG. 4D describes, with the number of the pieces of the frame data Dfrm included in a predetermined unit of processing as a parameter, which of the three sub processors 10a through 10c the task of decompressing each piece of the frame data Dfrm is assigned to.

Figure 4A:
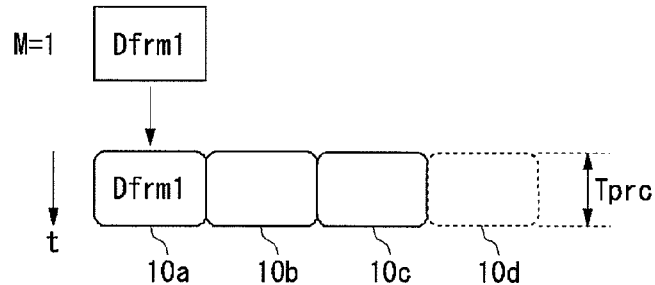
FIG. 4A through FIG. 4D schematically show a task distribution rule written in a frame decode module of FIG. 2.
Figure 4B:
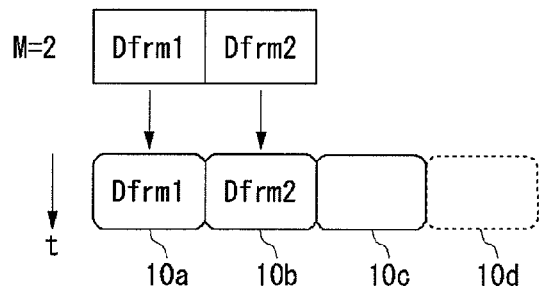
Figure 4C:
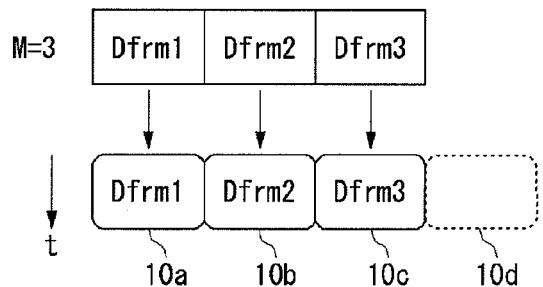

FIG. 4A through FIG. 4D show the distribution rule in the case where the number of the frame data to be processed at a time, namely, the number "M" of the tasks to be processed varies between 1 and 4. In this distribution rule, while "M" varies 1 to 3, the task to be processed is distributed, as a general rule, with a priority given so as to decrease the period of time occupying each processor in the direction in which the number of the processors is increased, that is, to increase the parallelism of processing. To put in other words, as shown in FIG. 4A through FIG. 4C, as the number of pieces of the frame data Dfrm increases, the number of the occupied processors is increased accordingly. When "M" varies between 1 and 3, data with a reproduction time of ("M"×Tf) minutes is processed in the real processing time Tprc, which is equal to 2 Tf. When "M" is 1, the data with a reproduction time equal to the frame time Tf is processed in the real processing time Tprc, which is equal to 2 Tf. The reproduction will not be affected by buffering and then processing data having the frame time Tf at the minimum, in consideration of process balancing.

In the above distribution rule, there is an exception in which when the number of the processors is "N" ("N" is an integer equal to or smaller than 2), and the number of pieces of data to be processed is "M" ("M" is a natural number) and "M" has a divisor "L" ("L" is an integer between 2 and N, both inclusive), the distribution rule is so defined that the "M" tasks corresponding to "M" pieces of data are distributed to "L" processors in parallel.

Figure 4D:
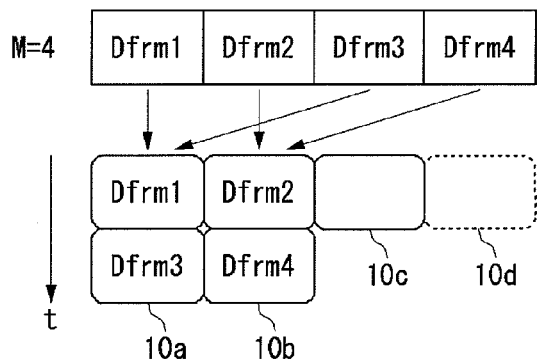

Specifically, the number of the sub processors 10 ("N") is 3, and the number of the pieces of the frame data to be processed ("M") is 4. "M" (=4) includes "L" (=2) as a divisor. Referring now to FIG. 4D, when "M" is 4, two tasks are distributed to the sub processors 10a and 10b, respectively, so as to cause the sub processors 10a and 10b to execute a batch process.

If there is no exception rule discussed above and "M" is 4, two tasks will be assigned to any one of the three sub processors 10. For example, two tasks will be assigned to the sub processor 10a and one task will be assigned to each of the remaining sub processors 10b and 10c. When each processor executes synchronous processing, the sub processors 10b and 10c are in the condition that they do not execute a process while the sub processor 10a is executing the second task. This will degrade the use efficiency of the processor. The three sub processors 10 are occupied during the period of 2 Tprc (equal to 4 Tf). Therefore, the processing cost is equal to 3×2 Tprc. Conversely, since 4×Tprc is the period while the process is substantially being executed, the usage rate of the processors is 4 Tprc/6 Tprc=⅔. This means that there is a waste.

Meanwhile, when the tasks are distributed as shown in FIG. 4D, the two sub processors 10a and 10b are occupied during the period of 2 Tprc. The processing cost is 4 Tprc (2×2 Tprc), and the amount of data to be actually processed is 4×Tprc. Therefore, 4 Tprc/4 Tprc=1. The data processing is enabled at a high efficiency.

Since one of the three sub processors 10a through 10c is not occupied, another task other than one performed by the frame decoder 316 can be executed in parallel. For example, a task of generating an image on the basis of audio data being reproduced is an example of the task to be processed in parallel by using a processor that is not occupied.

Figure 5:
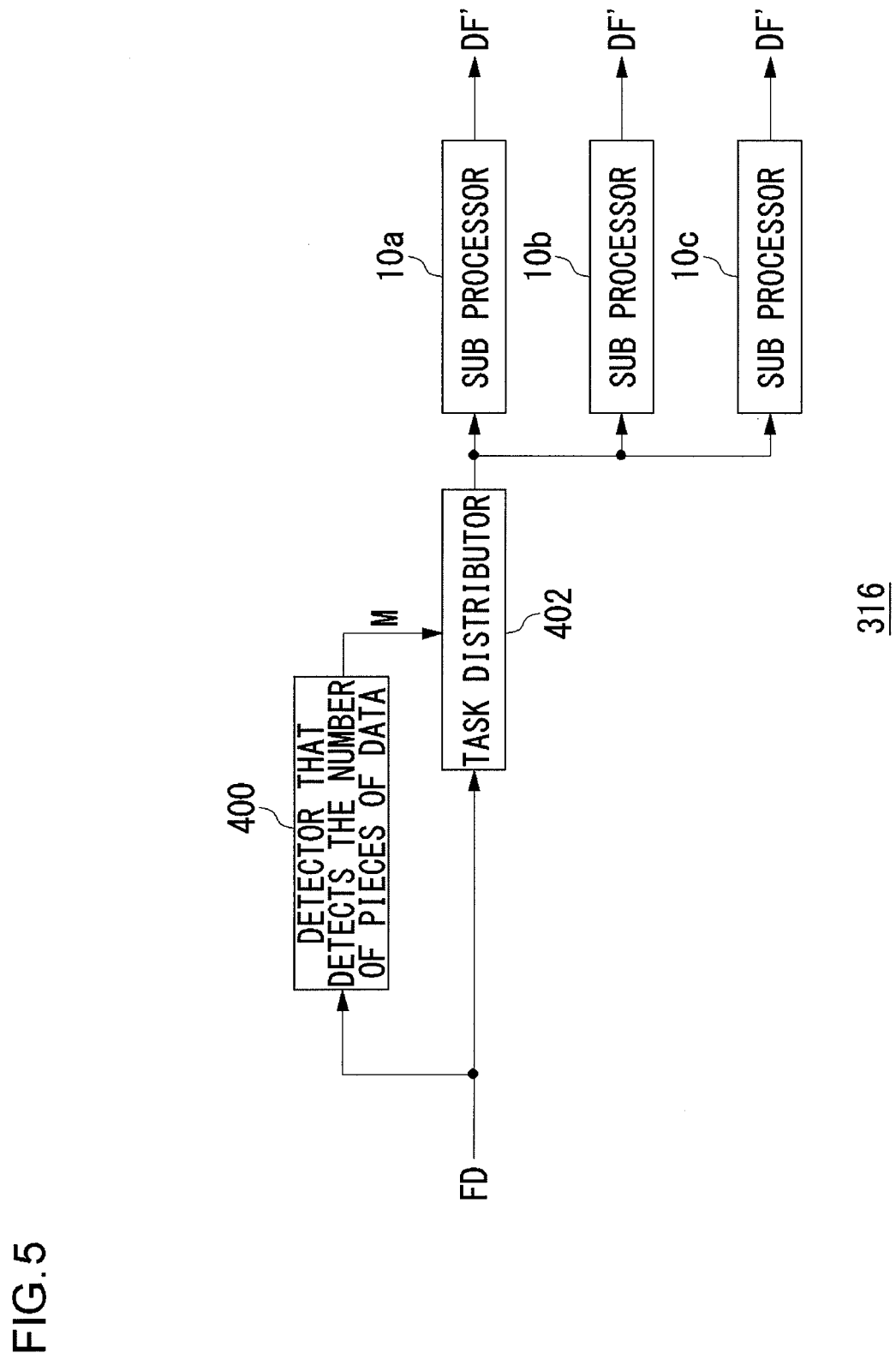
FIG. 5 illustrates a functional block diagram of a frame decoder of FIG. 3.
Figure 6A:
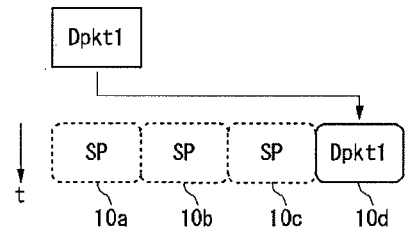
FIG. 6A through FIG. 6D schematically show the task distribution rule written in a filter module of FIG. 2.
Figure 6B:
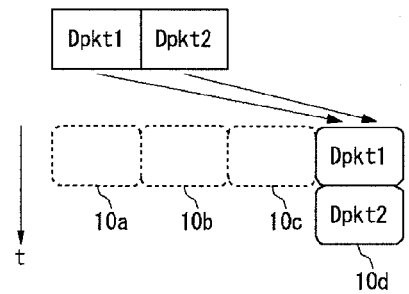
Figure 6C:
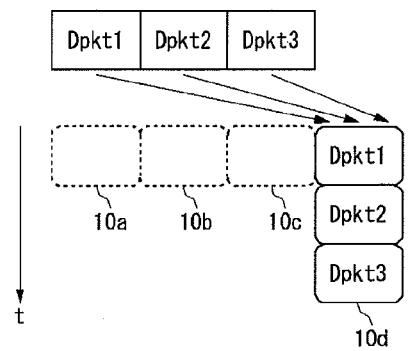
Figure 6D:
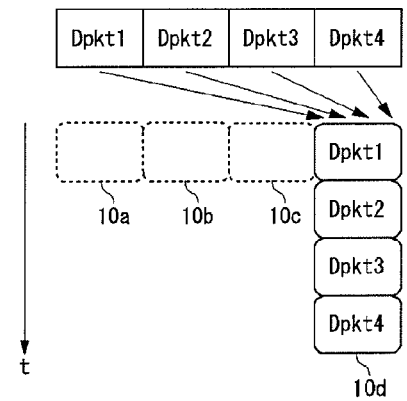

FIG. 5 illustrates a functional block diagram of the frame decoder 316 of FIG. 3. The frame decoder 316 includes plural processors 10a through 10c; a detector 400 that detects the number of pieces of data; and a task distributor 402.

The sub processors 10a through 10c initiates the decompression process according to a predetermined algorithm on the frame data Dfrm that has been distributed. The decompression process is written in the frame decoding module 94 of the application 90. The detector 400 detects the number "M" of the pieces of the frame data Dfrm included in a predetermined unit of processing. The task distributor 402 distributes the data to the sub processors 10a through 10c, respectively, according to a predetermined distribution rule with the number "M" of pieces of the frame data Dfrm defined as a parameter. The frame decoding module 94 of the application 90 causes the main processor 20 to initiate the detection of the number of pieces of the frame data Dfrm and to serve as the detector 400. Also, the frame decoding module 94 causes the main processor 20 to initiate the task distribution of each piece of the frame data according to the distribution rule written in the frame decoding module 94 and to serve as the task distributor 402.

The sub processors 10a through 10c decompress the frame data Dfrm that has been compressed by the DST process. Such decompressed frame data is bit-stream data in the DSD format. The sub processors 10a through 10c output the frame data Dfrm as packet data Dpkt in units of 4704 bytes. The packet data Dpkt is stored in a data buffer 318 of FIG. 3.

In this manner, in the SACD reproducing apparatus 300 according to the present embodiment, the frame decoder 316 includes in the program code: a source code that causes the sub processor to execute the decompression process on each piece of the frame data Dfrm that has been compressed by the DST process; a code for detecting the number "M" of pieces of the frame data Dfrm included in a predetermined unit of processing; a code in which a distribution rule for distributing the frame data Dfrm to the sub processor is defined with the number "M" of pieces of the frame data Dfrm as a parameter; and a code for distributing the task to the sub processor according to the distribution rule.

If the OS is caused to distribute plural tasks like a conventional method, a necessary task may be postponed in some cases. This degrades the real-time performance in the processing. Conversely, in the SACD reproducing apparatus 300 according to an embodiment of the present invention, it is possible to designate which processor executes the task for each piece of data at the time of programming an application program. This allows a programmer of the application 90 to estimate the time to complete the task with certainty. As a result, the SACD reproducing apparatus 300 according to an embodiment of the present invention can be used suitably for the process that demands the real-time performance, especially.

Referring back to FIG. 3, a description will now be given of the process of a decimation filter 320 and the processes that follow. The decimation filter 320 reads out the packet data Dpkt from the data buffer 318. The decimation filter 320 removes a high-frequency component of the packet data Dpkt, downsamples and converts the packet data Dpkt into the data in PCM format. The filtering process performed by the decimation filter 320 mainly includes processes such as convolution operation, namely, delay of bit data and four arithmetic operations. Thus, the filtering process has a property that the amount of data to be processed is fixed and is not so large, whereas the amount of calculation is large. Accordingly, the filtering process is suitable for the sub processor 10, which supports the SIMD operation and performs an arithmetic operation or a bit operation at high speed, rather than the main processor 20. Preferably, the application 90 is coded such that the sub processor 10 is caused to execute the task relating to the filtering process. The decimation filter 320 is implemented mainly by the filter module 96 of the application 90 and by the sub processor 10.

In the case where there is a limit to the capacity of a dedicated local memory 12*d* provided in the sub processor 10*d*, the packet data Dpkt is divided so that the batch processing is performed by software pipelining.

FIG. 6A through FIG. 6D schematically show the task distribution rule written in the decimation filter 320. The task distribution process may be performed by the main processor 20 operating in a layer immediately lower than the OS 72. In this case, the main processor 20 reads out the distribution rule at the time of executing the task relating to the filter module 96, and distributes the task to the sub processor 10*d* based on the above rule.

The process distributed to the sub processor 10*d* is a process based on the identical program code as well as being a task executed for each piece of the packet data Dpkt to be processed.

FIG. 6A through FIG. 6D show the distribution rule in the case where the number of pieces of the packet data Dpkt included in a predetermined unit of processing to be processed at a time, in other words, the number "P" of the tasks to be processed varies between 1 and 4. In this distribution rule, while "P" varies between 1 and 4, the task to be processed is distributed with a priority given to the time axis direction so that the number of the processors to be occupied is decreased, and the batch processing is conducted by pipelining.

To put in other words, as shown in FIG. 6A through FIG. 6D, as the number "P" of the packet data Dpkt to be processed increases, the period of time while the sub processor 10*d* is being occupied is increased. It is desirable that the upper limit of the number of the pieces of data available to the batch processing be set to a range where the real-time performance is not degraded.

For example, if it is assumed that Tprc' is the time needed for processing one piece of the packet data Dpkt and Tply is the actual time of reproducing the audio data corresponding to one piece of the packet data Dpkt, the batch processing is enabled by pipelining "d" pieces of the packet data satisfying d≤Tply/Tprc'. If the number of data to be processed exceeds "d", the task may be distributed to another sub processor 10.

The distribution rule shown in FIG. 6A through FIG. 6D may be written as an application code of the application 90. Also, the distribution rule may be written as a code in the layer of the AFW 80 or the virtual OS 78, so that the frame decoding module 94 of the application 90 may designate the task process according to the distribution rule.

As stated above, the task is distributed with a priority given to the time axis direction in the decimation filter 320 so as to decrease the number of the processors to be occupied. As a result, a larger number of the sub processors 10 can be assigned to the process performed by the frame decoder 316 so that the tasks may be executed concurrently and in parallel.

Subsequent to the filtering process executed by the decimation filter 320, data in PCM format (hereinafter, referred to as PCM data Dpcm) is generated. The PCM data Dpcm is stored in a first PCM buffer 322.

Then, an effector 324 executes a given effects process on the PCM data Dpcm. The effects process includes the fade-in and fade-out, volume control, and panning for sorting data into L channel and R channel.

The effects process is a simple process; however, it has a tendency of handling a large amount of data and requiring a large memory space temporarily used. Accordingly, the effector 324 distributes the task relating to the effects process to the main processor 20, in consideration of the characteristics, described above, of the processors. In this case, the effector 324 is mainly configured by cooperation of the main processor 20 and the effector module 98.

In the case where the number of the sub processors 10 available is sufficient, the task may be assigned to the sub processor 10 that supports the SIMD instruction set, so the batch processing is initiated. In this case, the effector 324 is composed of: the sub processor 10; and the effector module 98. The distribution rule shown in FIG. 6A through FIG. 6D may be applied to the batch processing.

The PCM data Dpcm subjected to the effects process executed by the effector 324 is stored in a second PCM buffer 326. An output unit 328 reads out the PCM data Dpcm from the second PCM buffer 326, and outputs the PCM data Dpcm to the sound outputting unit 122. The data outputting module 99 distributes the task relating to the data output to the sub processor 10. Accordingly, the output unit 328 is mainly composed of: the data outputting module 99 of the application 90; and the sub processor 10.

As stated heretofore, a description has been given of the information processing apparatus 200 and the SACD reproducing apparatus 300, according to an embodiment of the present invention. The following discussion summarizes the technique of distributing the task, which is fulfilled by, for example, the SACD reproducing apparatus 300 as an example.

According to an embodiment of the present invention, one feature is that a layer lower than the application program provides the application program with the function of designating which processor the task to be executed by the application program is distributed to. The rule of distributing plural tasks to processors, respectively, is written in the program code of the application program such that the application designates which processors the tasks are distributed to.

This allows a programmer of the application program to determine appropriately which processor each task is assigned to, in accordance with the content of processing and the characteristics of the processor. In an embodiment of the present invention, "data reading process", "frame decoding process", "digital filtering process", "effects process", and "data outputting process" are exemplified as the tasks to be executed by the application program. The application 90 designates which one of the sub processors 10 and the main processor 20 executes each of the above tasks, in accordance with the content of the task.

In addition, in an embodiment of the present invention, the rule for distributing the tasks for plural pieces of data to plural sub processors is defined, in the case where an identical process is performed on plural pieces of data, for example, in the "frame decoding process" or the "digital filtering process".

Figure 7:
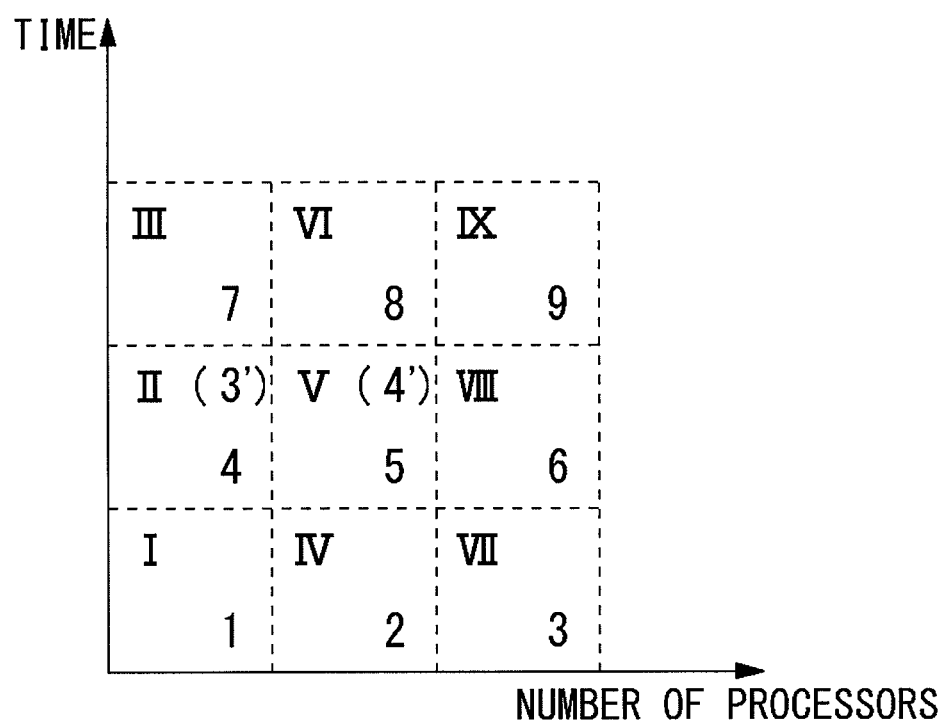
FIG. 7 schematically illustrates first and second task distribution methods.

FIG. 7 schematically illustrates first and second task distribution methods. The horizontal line of the matrix of FIG. 7 represents the number of the processors occupied, and the vertical line thereof represents the time while the processors are being occupied. FIG. 7 depicts the rule in the case where the tasks are assigned to three processors. In the first distribution method, as the number of the tasks to be processed increases, the tasks are distributed in the horizontal axis direction according to the rule indicated by Arabic numbers. That is to say, in the first method, the task for each piece of data to be processed is distributed with a priority given in the direction in which the number of the processors is increased, in other words, so as to increase the parallelism of processing and to decrease the period of time occupying each processor. As shown in FIG. 4A through FIG. 4D, the task is distributed in the "frame decoding process" in conformity with the first method. The length of the horizontal axis in the first method is defined according to the number of the processors available.

In the second distribution method, as the number of the tasks to be processed increases, the task is distributed in the time axis direction in accordance with the rule indicated by Roman numbers. That is to say, in the second method, the task for each piece of data to be processed is distributed with a priority given to the time axis direction so as to reduce the number of the processors occupied. As shown in FIG. 6A through FIG. 6D, the task is distributed in accordance with the second method in the "digital filtering process". The length of the time axis (vertical line) in the second method, namely, how many tasks are assigned to one processor for the batch processing may be determined in accordance with the processing time. FIG. 7 depicts an example of assigning three tasks to one processor for the batch processing.

In an embodiment of the present invention, attention is focused on the use efficiency of the processors. For example, in the case where the first distribution rule is employed and four tasks are processed, as shown in FIG. 7, two tasks are distributed to one of three processors and only one task is assigned to two remaining processors. Thus, the areas indicated by Arabic numbers 5 and 6 are empty areas in the two remaining processors. In order to prevent such wasteful occupancy of the processors, in the case where the number "M" of the pieces of data to be processed has a divisor "L" in the "frame decoding process", the distribution rule is defined such that "M" tasks corresponding to "M" pieces of data are assigned to "L" processors in parallel. That is to say, the processors are occupied in such a manner as indicated by the Arabic numbers of 1, 2, 3', and 4' in FIG. 7. In this case, two processors are occupied during the same period and the one remaining processor is not occupied, whereby the one remaining processor is allowed to execute another process.

The distribution rules in the "frame decoding process" and the "digital filtering process" describe which one of plural processors the task for processing each piece of data is assigned to, with the number of pieces of data included in a predetermined unit of processing as a parameter. That is to say, the processor to which i-th data is assigned and the i-th data are associated on a one-to-one basis.

The task distribution rule, however, is not limited to the first or the second method as illustrated in FIG. 7, and may be arbitrarily defined in an application program.

In addition, the first and second distribution methods may be defined in a system level, namely, in a layer lower than the application program, such as the OS, VOS, or AFW, in lieu of the application level. That is, the first method and the second method may be switchable in the core layer 70 lower than the application 90. The first and the second distribution rules may be written as a library, function, or object, so as to be provided by the OS, VOS, or AFW. In this case, which the first distribution method or the second distribution method is used for each type of the task may be written in the application program code, thereby improving the development efficiency of an application. When it is applied to the embodiment, the code designating the first method to the core layer 70 may be written in the frame decoding module 94 defining the "frame decoding process", and the code designating the second method to the core layer 70 may be written in the filter module 96 defining the "digital filtering process".

In such case, an application programmer is able to choose one from the two distribution methods in accordance with the content of the process, whereby the flexibility of software design can be enhanced.

The description of the invention given above is based upon an embodiment. The embodiment is illustrative in nature and various variations in constituting elements and processes involved are possible. Those skilled in the art would readily appreciate that such variations are also within the scope of the present invention.

In the embodiment of the present invention, a description is given of the task distribution technique with an example of reproduction of an SACD. The task distribution technique, however, may be applicable to various usages such as various simulations using a computer, image processing, etc.

While the preferred embodiments of the present invention have been described using specific terms, such description is for illustrative purposes only, and it is to be understood that changes and variations may be made without departing from the spirit or scope of the appended claims.

What is claimed is:

1. A method for distributing a task to a plurality of processors, comprising:
  writing a distribution rule for distributing a plurality of the tasks to the plurality of the processors in a program code of an application program configured to include the plurality of the tasks,
  wherein the distribution rule is defined by using a number of pieces included in a predetermined unit of processing as a parameter and includes a description of which processor the pieces of data included in the unit of processing are assigned to, the method further comprising detecting the number of the pieces of the data to be processed included in the predetermined unit of processing, and wherein the each of the tasks is assigned to a processor in accordance with the number of the pieces of the data detected; and reading the distribution rule at the time of executing the application program to distribute the plurality of the tasks to designated processors, respectively, in accordance with the distribution rule,
wherein the distribution rule is contained within the program code of the application program.

2. The method according to claim 1, wherein the plurality of the tasks are processes based on an identical program code as well as being the tasks, each executed for each piece of data to be processed.

3. The method according to claim 2, wherein in a case where the number of the processors is N, where N is an integer equal to or more than 2, and the pieces of the data to be processed is M, where M is a natural number,
given that M has an integer L as a divisor, L ranging between 2 and N, both inclusive,
the distribution rule is defined such that M tasks corresponding to M pieces of the data are distributed to L processors in parallel.

4. A method for distributing a task to a plurality of processors, when an information processing apparatus executes an application program including a plurality of tasks,
wherein the plurality of the tasks are processes based on an identical program code as well as being the tasks, each executed for each piece of data to be processed,
the plurality of processors execute, for each predetermined unit of processing, a task corresponding to data included in the unit of processing, the number of pieces of data included in the unit of processing varying in a predetermined range according to a target of processing while the application program is being executed,
the method comprising:
detecting, for each unit of processing, a distribution rule for distributing the plurality of the tasks to the plurality of the processors previously written in a program code of the application program, the distribution rule being defined by using a number of pieces of data including in the unit of processing as a parameter and including a description of which one of the plurality of the processors the task of processing the pieces of data is assigned to;
distributing, for each unit of processing, the plurality of the tasks to the plurality of the processors designated, respectively, in accordance with the distribution rule detected;
detecting, for each unit of processing, the number of the pieces of the data included in the unit of processing; and
distributing, for each unit of processing, the plurality of tasks to a designated processor in accordance with the distribution rule defined for the number of pieces of data detected to be included in the unit of processing,
wherein the distribution rule is contained within the program code of the application program.

5. The method according to claim 4, wherein in a case where the number of the processors is N, where N is an integer equal to or more than 2, and the pieces of the data to be processed is M, where M is a natural number,
given that M has an integer L as a divisor, L ranging between 2 and N, both inclusive, the distribution rule is defined such that M tasks corresponding to M pieces of the data are distributed to L processors in parallel.

6. The method according to claim 4,
wherein the distribution rule includes a first rule and a second rule,
the first rule distributes the tasks to be processed with a priority given in a direction in which the number of the processors is increased so as to decrease a period of time occupying each of the processors; and
the second rule distributes the tasks to be processed with a priority given to a time axis direction so as to decrease the number of the processors to be occupied,
wherein the first rule and the second rule are appropriately selected and switched.

7. The method according to claim 6, wherein the first rule and the second rule are defined in a layer lower than an application program, and the application program executed on the layer includes a program code designating which of the first rule or the second rule each of the tasks is to be distributed by, when the plurality of given tasks included in the program are executed.

8. An information processing apparatus comprising:
a plurality of processors which execute, for each unit of processing, a predetermined process on data included in the unit of processing;
a detector which detects, for each unit of processing, the number of pieces of the data included in the unit of processing and varying in a predetermined range according to a target of processing while an application program is being executed; and
a distributor which distributes the data to the plurality of the processors in accordance with a predetermined distribution rule defined for the number of the pieces of the data detected,
wherein the distributing rule is written in the application program, and the distribution is defined by using a number of pieces of data including in the unit of processing as a parameter and includes a description of how the pieces of data included in the unit of processing is assigned to the plurality of processors,
wherein the distribution rule is contained within the program code of the application program.

9. The information processing apparatus according to claim 8, wherein in a case where the number of the processors is N, where N is an integer equal to or more than 2, and the pieces of the data included in the predetermined unit of processing is M, where M is a natural number,
given that M has an integer L as a divisor, L ranging between 2 and N, both inclusive,
the distribution rule is defined such that M tasks corresponding to M pieces of the data are distributed to L processors in parallel.

10. The information processing apparatus according to claim 8, wherein the distributor distributes the data in accordance with a first method or a second method, which has been selected,
the first method distributing the data with a priority given in a direction in which the number of the processors is increased so as to decrease a period of time occupying each of the processors,
the second method distributing the data with a priority given to a time axis direction so as to decrease the number of the processors to be occupied.

* * * * *